United States Patent
Marcotte et al.

(10) Patent No.: US 7,049,521 B2
(45) Date of Patent: May 23, 2006

(54) FLEXIBLE WIRING DUCT

(75) Inventors: Eugene R. Marcotte, Kankakee, IL (US); Peter E. Bingham, Lockport, IL (US); Andrew J. Chaloupka, Western Springs, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 11/093,871

(22) Filed: Mar. 30, 2005

(65) Prior Publication Data

US 2005/0217880 A1    Oct. 6, 2005

Related U.S. Application Data

(60) Provisional application No. 60/557,825, filed on Mar. 30, 2004.

(51) Int. Cl.
*H02G 3/04* (2006.01)

(52) U.S. Cl. .............. 174/100; 174/68.3; 174/99 E (58) Field of Classification Search ............ 174/48, 174/68.1, 68.3, 95, 96, 97, 98, 99 E, 100, 174/101; 138/106, 157; 248/49, 68.1; 385/100, 385/134, 135; 59/78.1
See application file for complete search history.

(56) References Cited

U.S. PATENT DOCUMENTS

| | | | | |
|---|---|---|---|---|
| 2,896,009 A | * | 7/1959 | Caveney | 174/72 A |
| 2,921,607 A | | 1/1960 | Caveney | |
| 3,637,957 A | * | 1/1972 | Janzow et al. | 174/99 E |
| 3,968,322 A | * | 7/1976 | Taylor | 174/72 A |
| 4,669,507 A | * | 6/1987 | Moritz | 174/101 |
| 5,240,209 A | | 8/1993 | Kutsch | |
| 5,300,732 A | * | 4/1994 | Wambeke et al. | 138/156 |
| 5,322,480 A | * | 6/1994 | Meier et al. | 174/97 |
| 5,335,349 A | | 8/1994 | Kutsch et al. | |
| 5,595,453 A | * | 1/1997 | Nattel et al. | 174/48 |
| 5,602,364 A | * | 2/1997 | Ustin | 174/68.3 |
| 5,839,702 A | | 11/1998 | Jette | |
| 6,019,323 A | | 2/2000 | Jette | |
| 6,076,779 A | | 6/2000 | Johnson | |
| 6,361,000 B1 | | 3/2002 | Jette | |
| 6,460,812 B1 | | 10/2002 | Jette | |
| 6,470,129 B1 | | 10/2002 | Wentworth et al. | |
| 6,585,195 B1 | | 7/2003 | Wentworth et al. | |
| 6,609,684 B1 | | 8/2003 | Van Scoy et al. | |
| 6,637,704 B1 | | 10/2003 | Jette | |
| 6,653,568 B1 | * | 11/2003 | Davis | 174/68.3 |
| 6,708,480 B1 | * | 3/2004 | Wehler | 59/78.1 |
| 6,809,266 B1 | * | 10/2004 | Hoi et al. | 174/135 |
| 6,900,385 B1 | * | 5/2005 | Hsu | 174/36 |
| 2001/0007341 A1 | | 7/2001 | Jette | |

* cited by examiner

Primary Examiner—Dean A. Reichard
Assistant Examiner—Adolfo Nino
(74) Attorney, Agent, or Firm—Robert A. McCann; Christopher S. Clancy (57) ABSTRACT

A flexible wiring duct is disclosed. The wiring duct includes a base, a first side wall connected to the base, and a second side wall connected to the base. The wiring duct also includes a first aperture formed in the first side wall and extending into the base, and a second aperture formed in the second side wall and extending into the base.

9 Claims, 10 Drawing Sheets

FLEXIBLE WIRING DUCT

CROSS-REFERENCE TO RELATED APPLICATIONS

This application claims priority to U.S. Provisional Application Ser. No. 60/557,825, filed on Mar. 30, 2004, the entirety of which is hereby incorporated by reference.

BACKGROUND OF THE INVENTION

The present invention is directed to a wiring duct for use in a cable management system and, more particularly, a flexible wiring duct having a series of saw cuts made on a repeating pattern that allow the wiring duct to flex in any direction.

Wiring ducts for use in cable management systems are well known in the art. Moreover, bendable or adjustable cable guiding troughs are known in the art, as shown in U.S. Pat. Nos. 6,076,779 and 6,609,684. However, none of the prior art references, including the '779 and '684 patents, disclose a wiring duct having a series of saw cuts made on a repeating pattern that allow the wiring duct to flex in any direction.

SUMMARY OF THE INVENTION

It would be desirable to provide a flexible wiring duct having the ability to flex in any direction.

A flexible wiring duct is disclosed. The wiring duct includes a base, a first side wall connected to the base, and a second side wall connected to the base. The wiring duct also includes a first aperture formed in the first side wall and extending into the base, and a second aperture formed in the second side wall and extending into the base.

Preferably, the first aperture only extends through a portion of the first side wall and a portion of the base. Likewise, the second aperture only extends through a portion of the second side wall and a portion of the base.

Preferably, at least a portion of the first aperture overlies at least a portion of the second aperture in the base. Moreover, the first aperture is substantially the same length as the second aperture.

Preferably, the wiring duct further includes a third aperture formed in the first side wall or the second side wall. The third aperture only extends through a portion of the first side wall or the second side wall.

Preferably, the base includes a first end having no apertures formed therein, and a second end having no apertures formed therein.

DETAILED DESCRIPTION OF PREFERRED EMBODIMENTS

The illustrated embodiments of the invention are directed to a flexible wiring duct 20 that has the ability to flex in any direction. Preferably, wiring duct 20 is made of pliable material, such as plastic, and receives one or more telecommunication cables (not shown). However, it is likewise contemplated that wiring duct 20 may be made of other suitable flexible, elastic materials.

Figure 1:
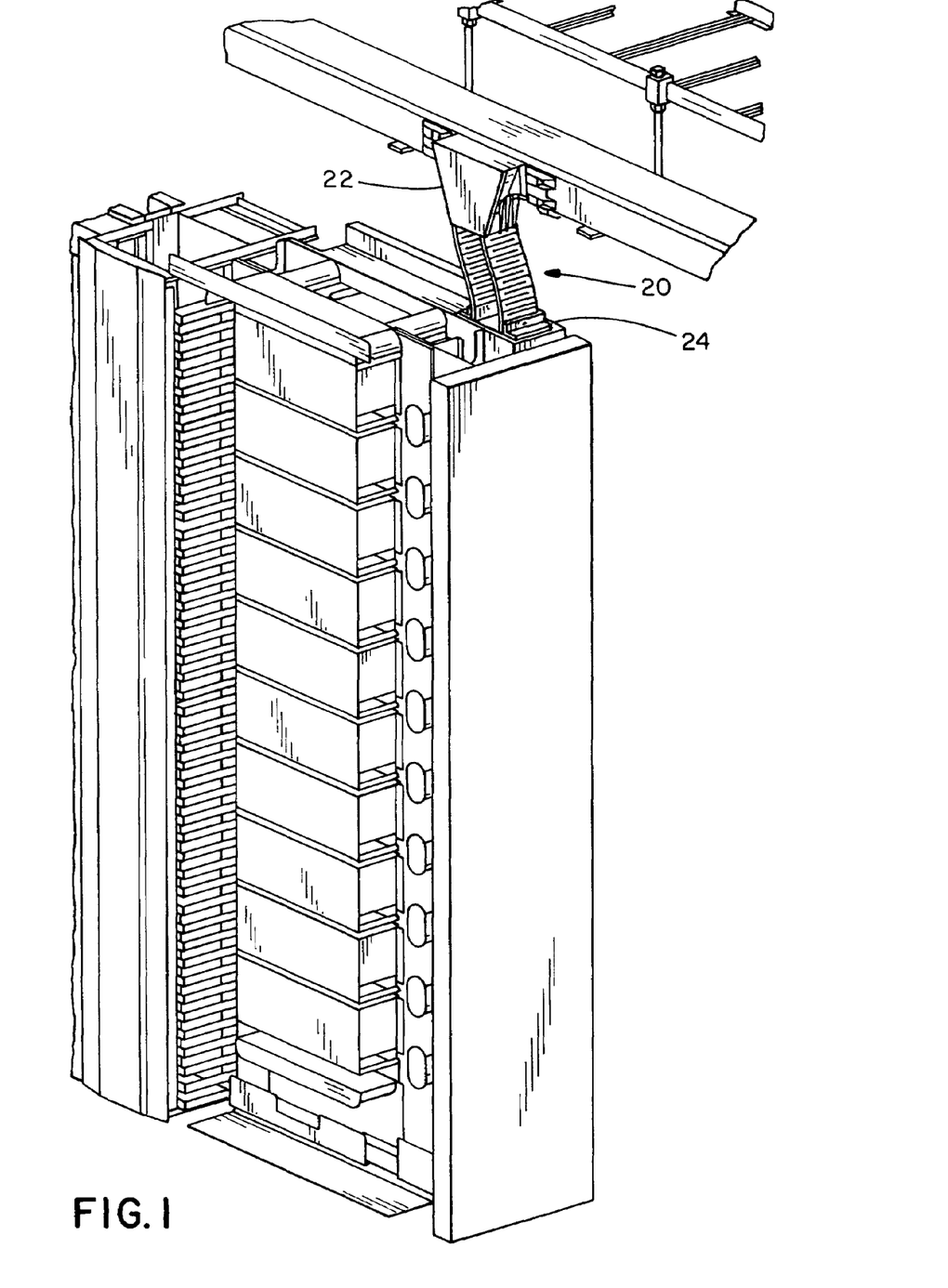
FIG. 1 is a front right perspective view of a flexible wiring duct according to the present invention, shown connecting a vertical tee fitting to a network rack system.
Figure 2:
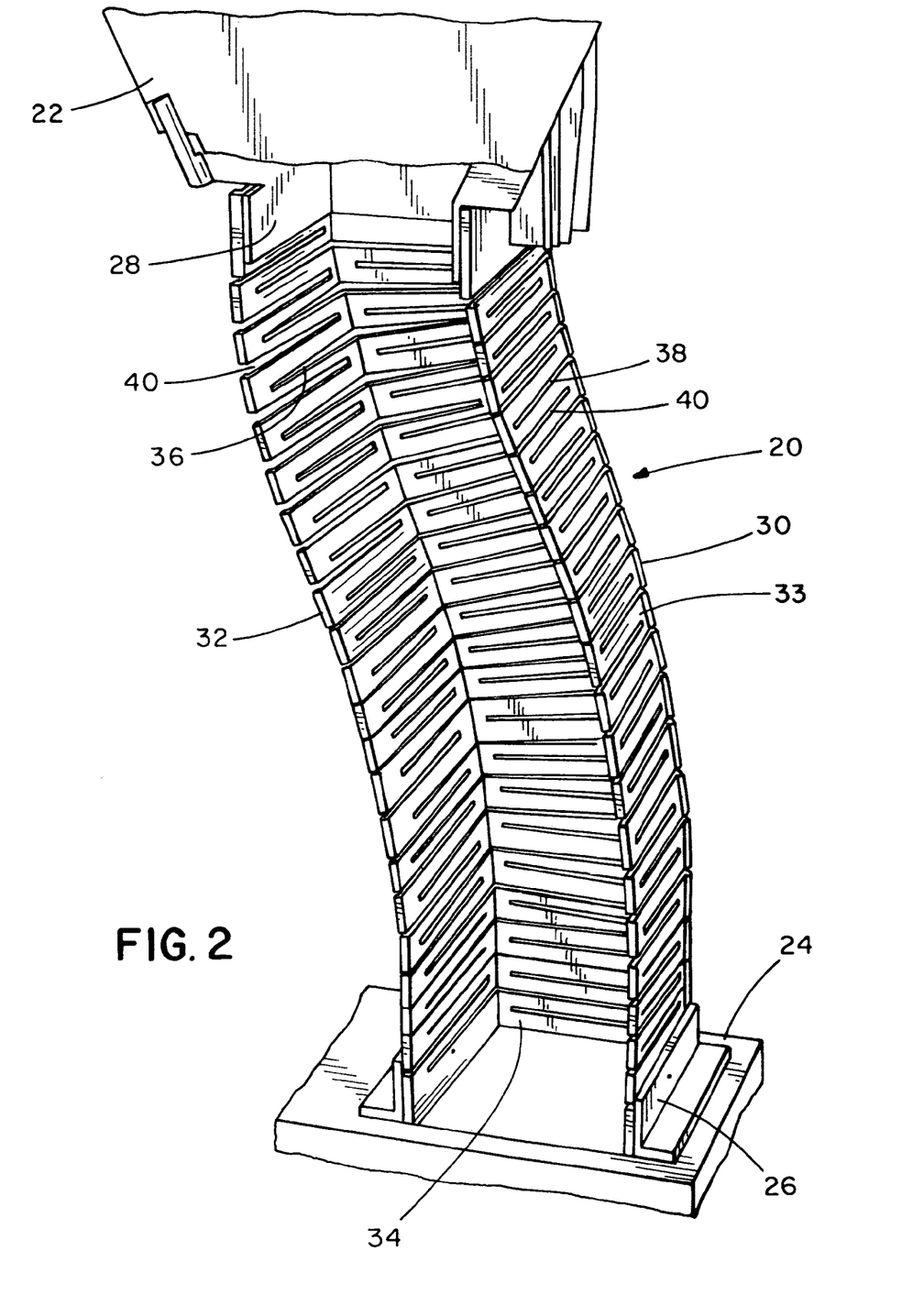
FIG. 2 is an enlarged perspective view of the flexible wiring duct of FIG. 1.
Figure 3:
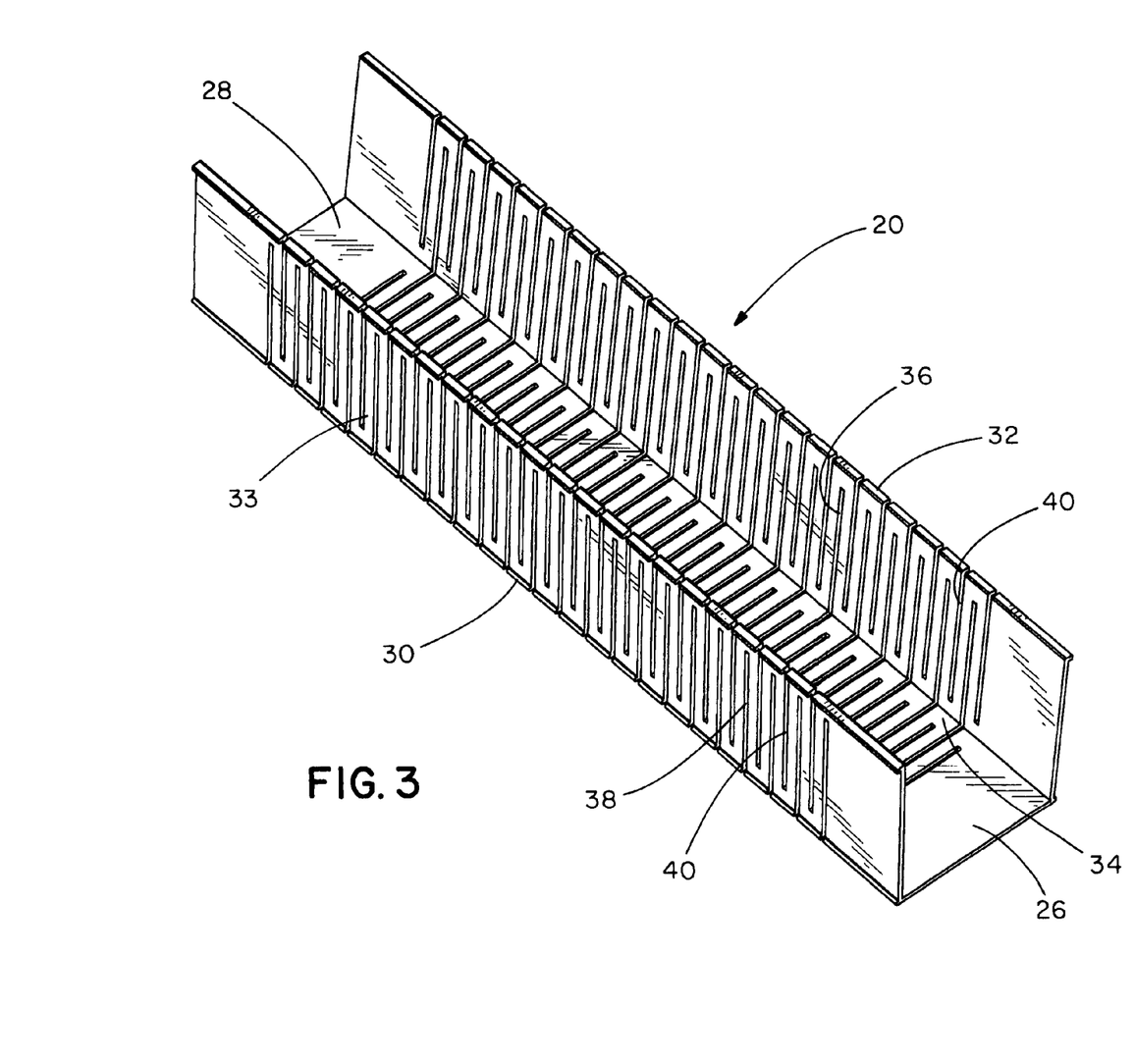
FIG. 3 is a top left perspective view of the flexible wiring duct of FIG. 1.
Figures 4, 5:
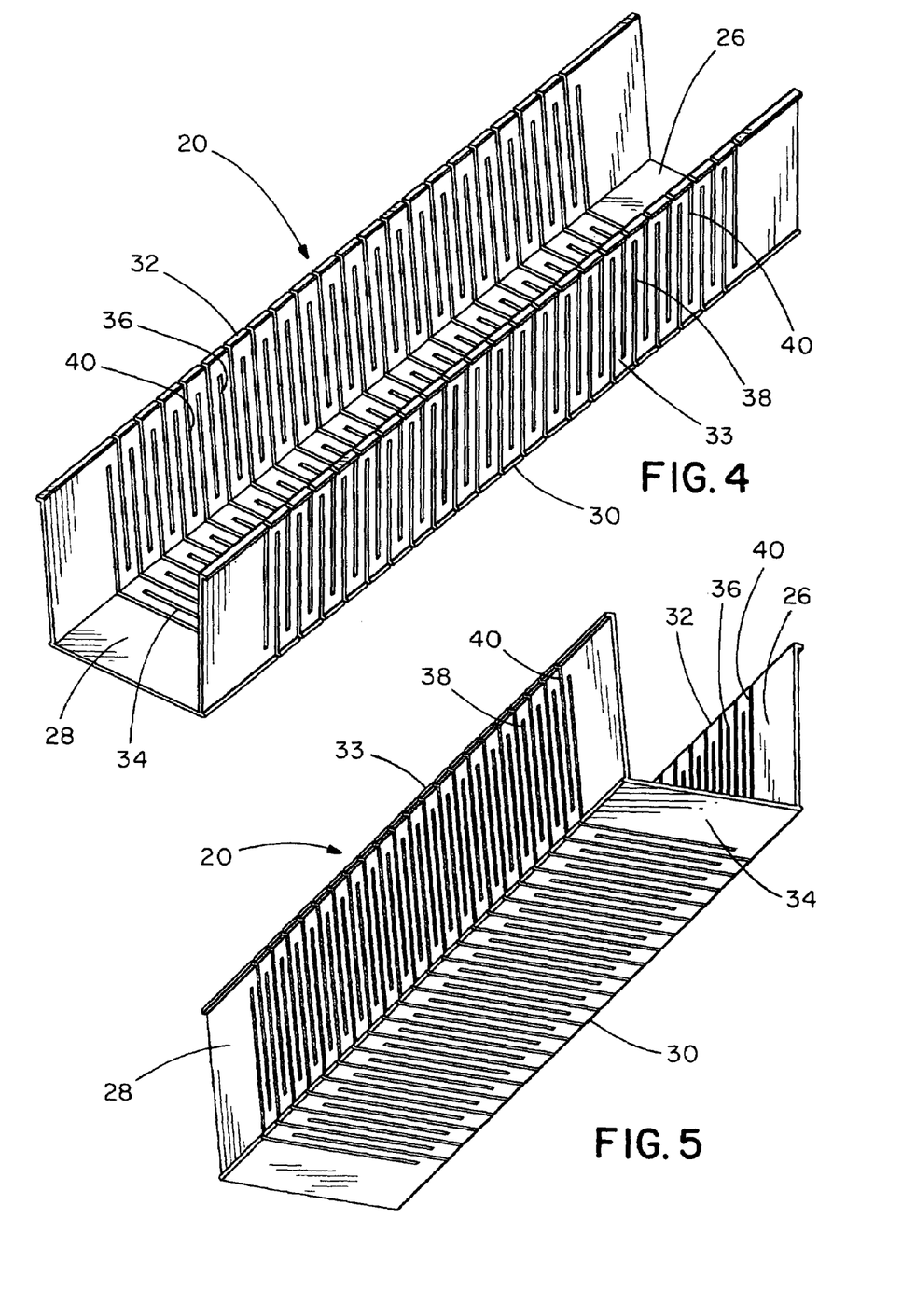
FIG. 4 is a top right perspective view of the flexible wiring duct of FIG. 1.
FIG. 5 is a bottom left perspective view of the flexible wiring duct of FIG. 1.
Figure 6:
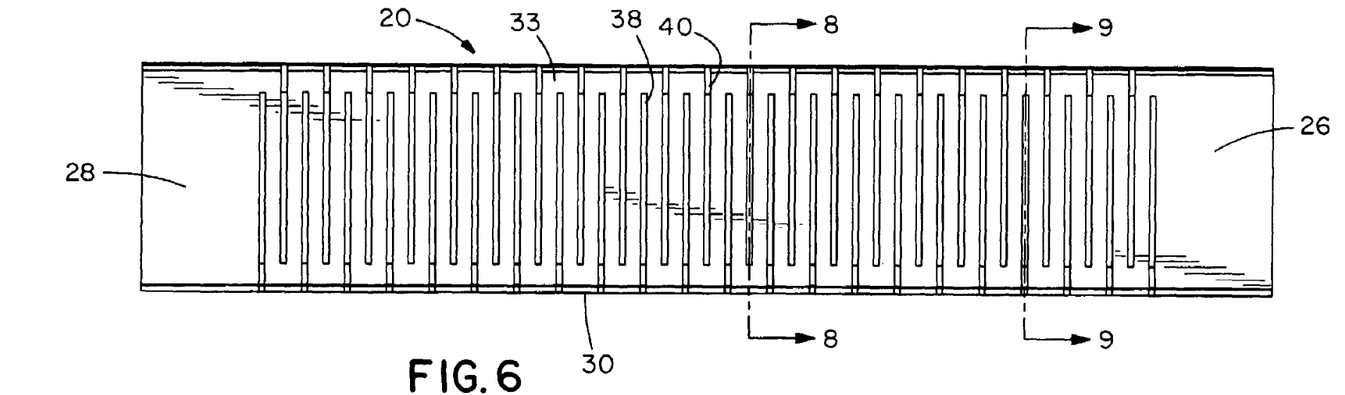
FIG. 6 is a side view of the flexible wiring duct of FIG. 1.
Figure 7:
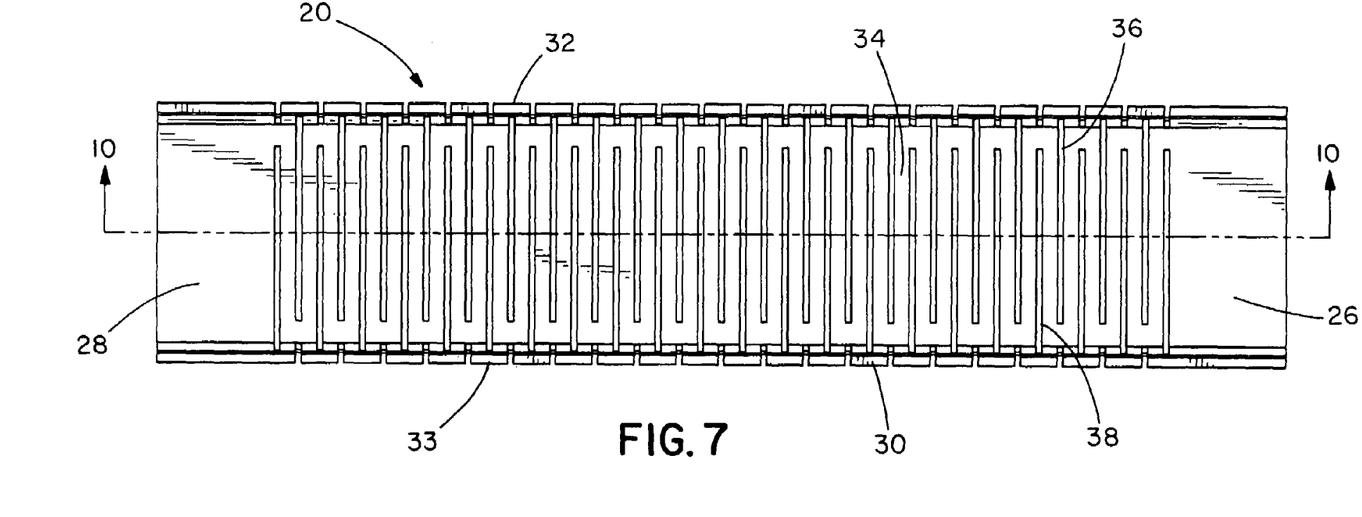
FIG. 7 is a top view of the flexible wiring duct of FIG. 1.
Figure 8:
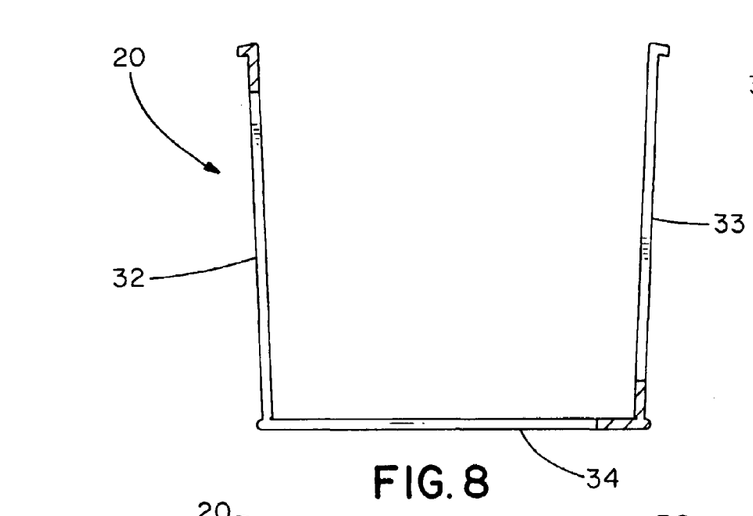
FIG. 8 is a cross-sectional view taken along lines 8—8 of FIG. 6.
Figure 9:
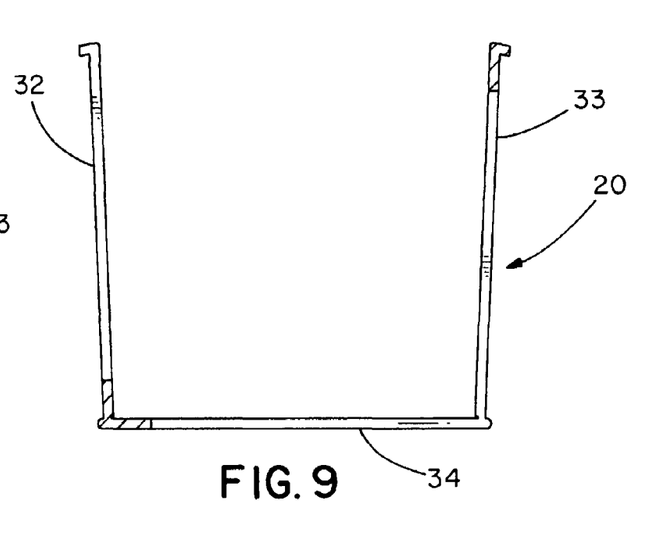
FIG. 9 is a cross-sectional view taken along lines 9—9 of FIG. 6.
Figure 10:
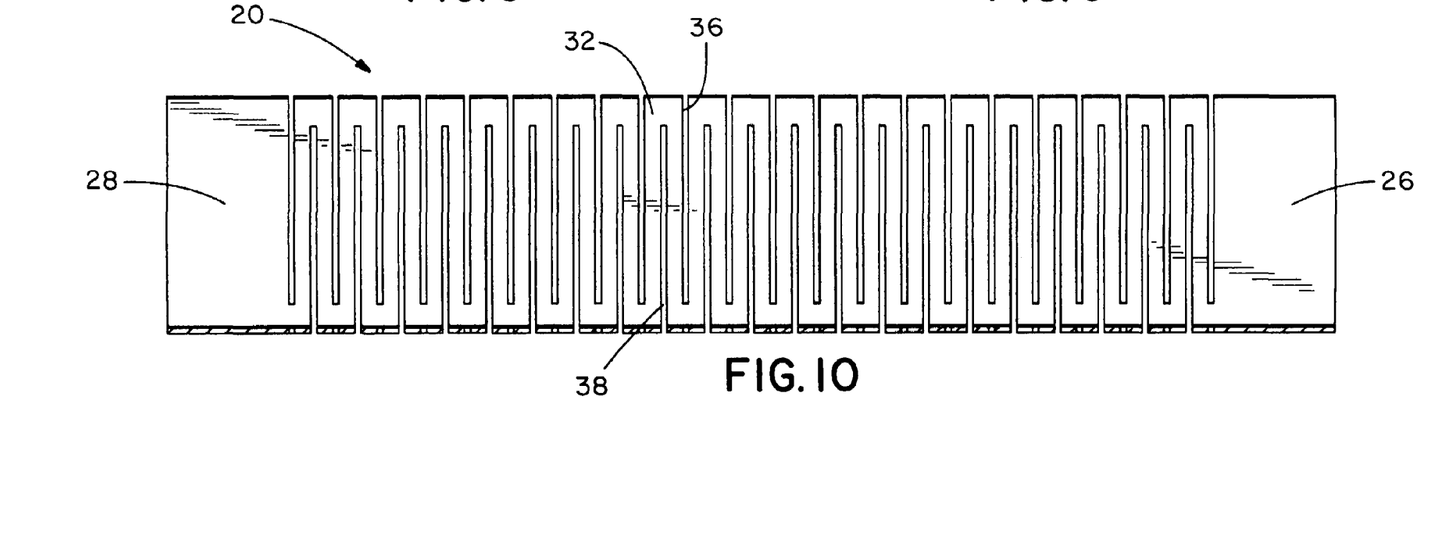
FIG. 10 is a cross-sectional view taken along lines 10—10 of FIG. 7.

As shown in FIGS. 1 and 2, wiring duct 20 connects two cable management structures in a cable management system, such as vertical tee fitting 22 and network rack 24. Wiring duct 20 allows for the protected routing of cables from a vertical tee fitting to a network rack that is not positioned directly below the exit of the vertical tee fitting. As best seen in FIGS. 3–7, wiring duct 20 has a first end 26, a second end 28 and a center section 30 connecting first end 26 and second end 28. First end 26 and second end 28 are solid and, thus, allow wiring duct 20 to be attached to vertical tee fitting 22 or network rack 24. As best seen in FIGS. 3–5, wiring duct 20 also includes side walls 32, 33 and a base 34. Although wiring duct 20 is shown in FIGS. 1–14 having an open top, it is likewise contemplated that wiring duct 20 may include a flexible hinged cover.

Wiring duct 20 is extruded and then material is removed from side walls 32, 33 and base 34 through a series of saw cuts made on a repeating pattern. Alternatively, wiring duct 20 may be molded and the alternating saw cut pattern may be integral in the mold. As best seen in FIGS. 3–5, the saw cuts remove material from side walls 32, 33 and base 34 to define first aperture 36, second aperture 38 and third aperture 40. Once the material has been removed from side walls 32, 33 and base 34, wiring duct 20 loses its rigid solid wall properties and becomes pliable. Thus, wiring duct 20 behaves like an accordion and has the ability to flex in any direction.

As best seen in FIG. 2, first aperture 36 is formed in side wall 32 and extends into base 34. Preferably, first aperture 36 only extends through a portion of side wall 32 and a portion of base 34. Moreover, as best seen in FIG. 5, second aperture 38 is formed in side wall 33 and extends into base 34. Preferably, second aperture 38 only extends through a portion of side wall 33 and a portion of base 34. First aperture 36 is substantially the same length as second aperture 38. As best seen in FIGS. 3 and 4, third aperture 40 is formed in side walls 32, 33. Preferably, third aperture 40 only extends through a portion of side walls 32, 33.

Figure 11:
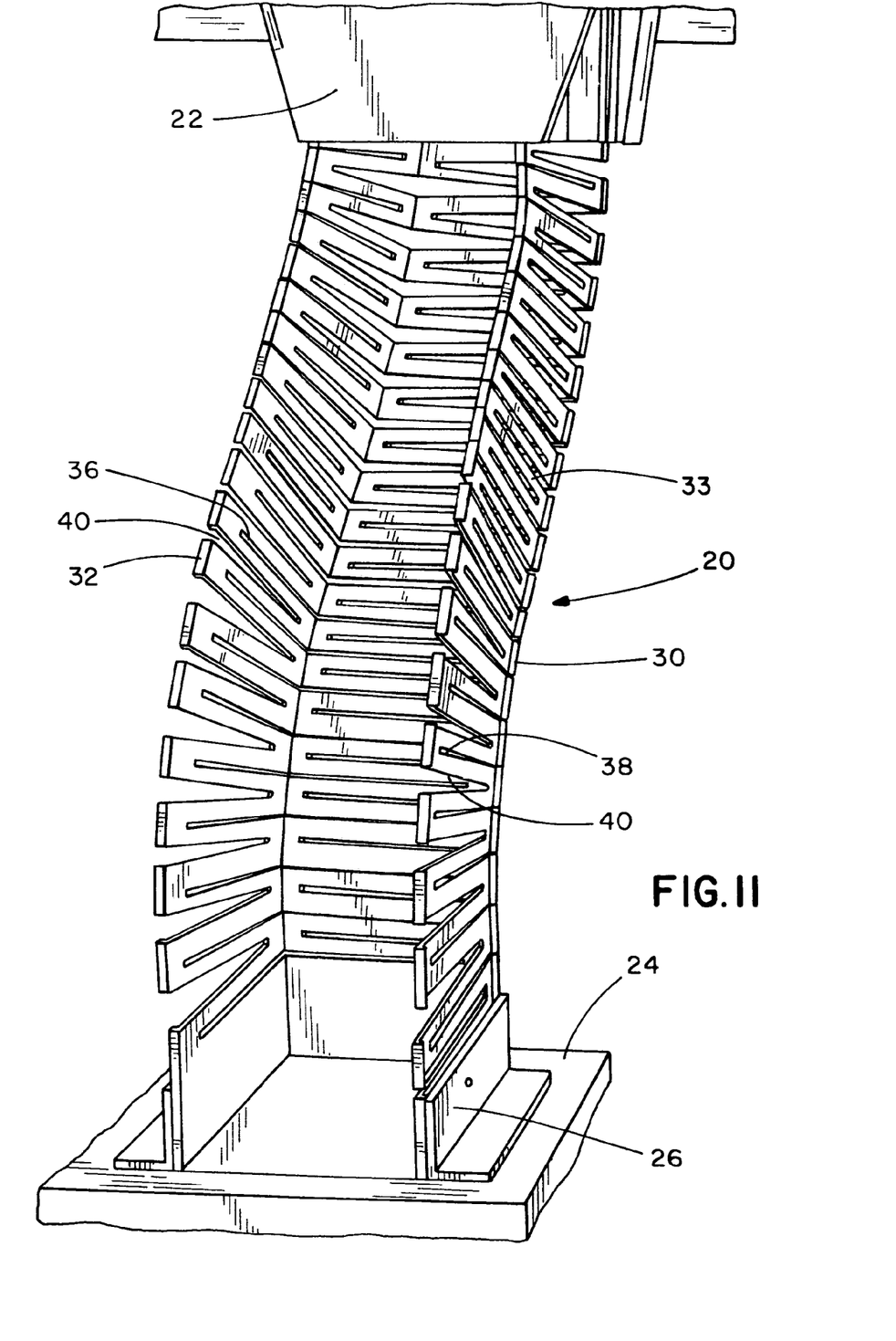
FIG. 11 is a front right perspective view of a flexible wiring duct according to another embodiment of the present invention.
Figure 12:
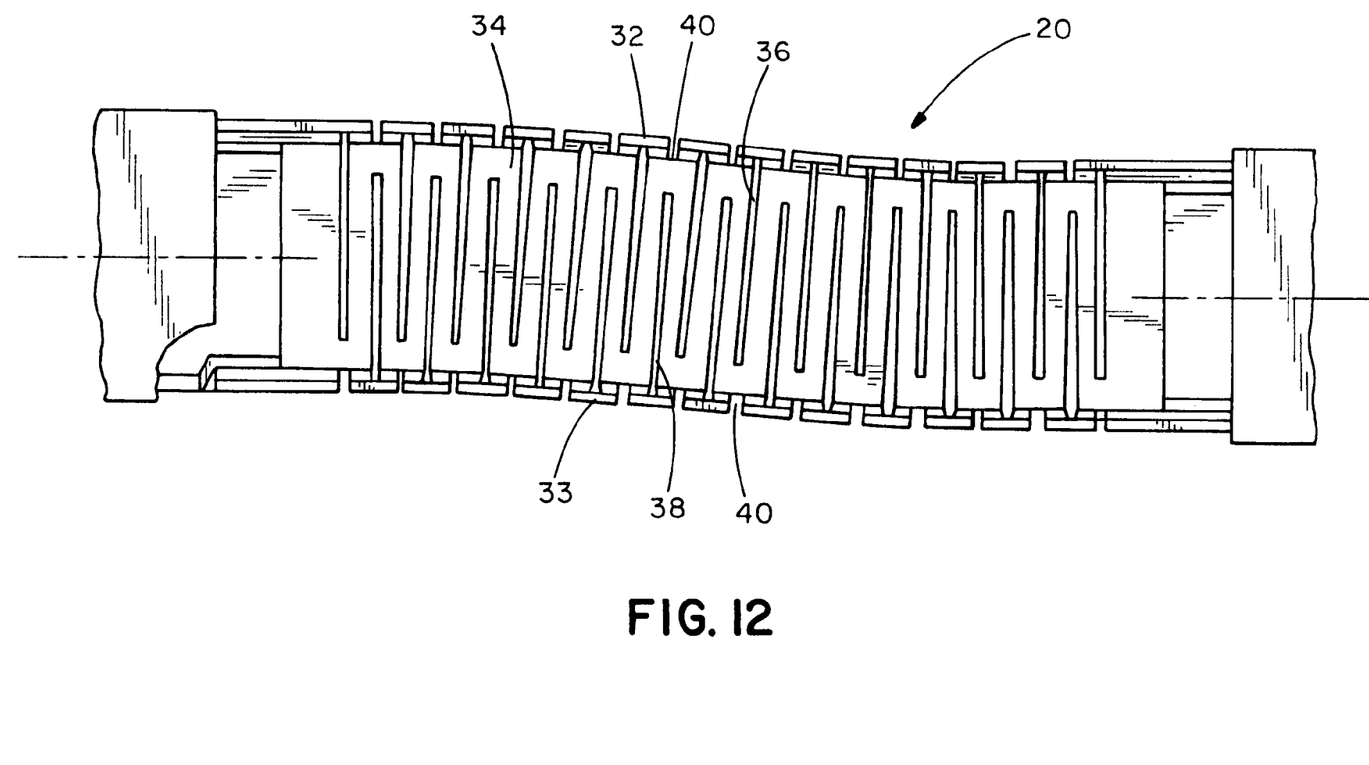
FIG. 12 is a top view of a flexible wiring duct according to yet another embodiment of the present invention.
Figure 13:
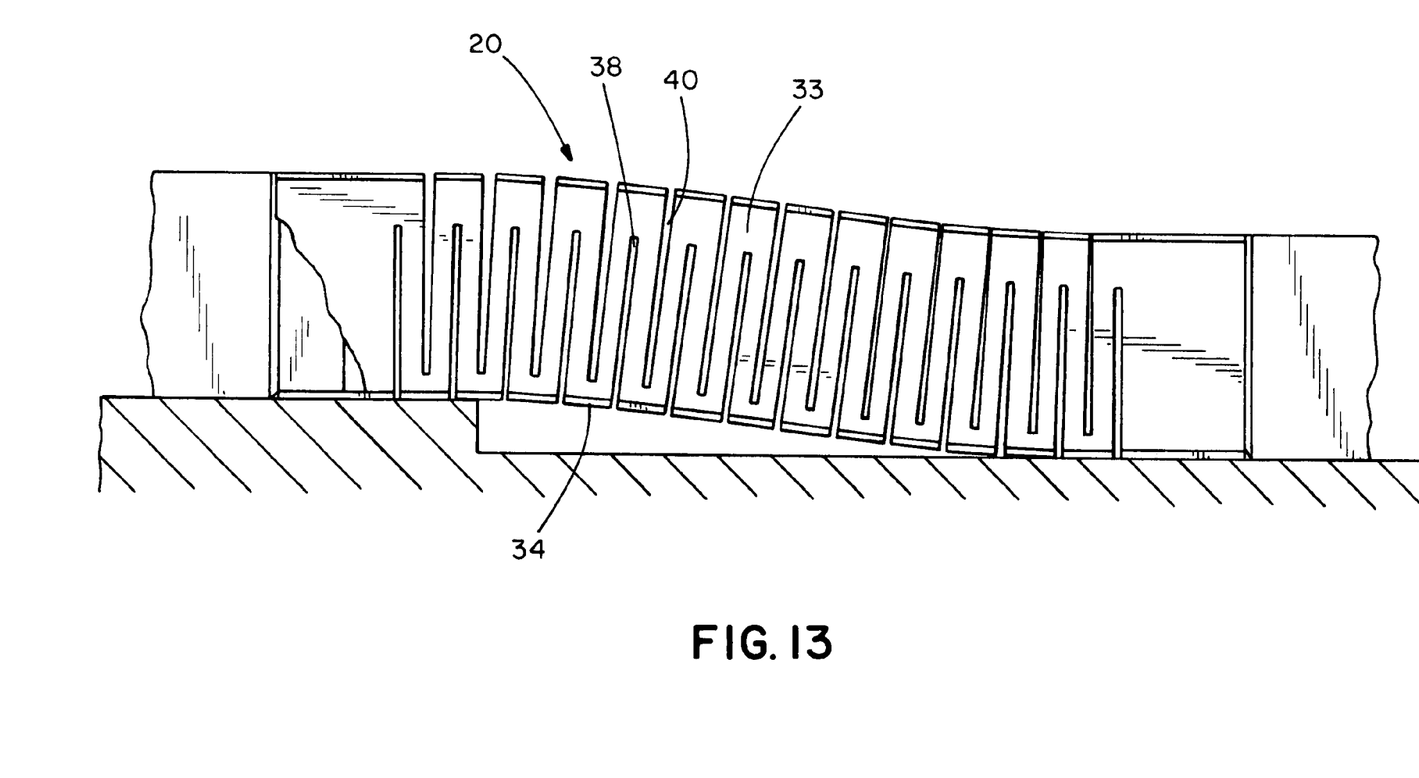
FIG. 13 is a side view of a flexible wiring duct according to another embodiment of the present invention.
Figure 14:
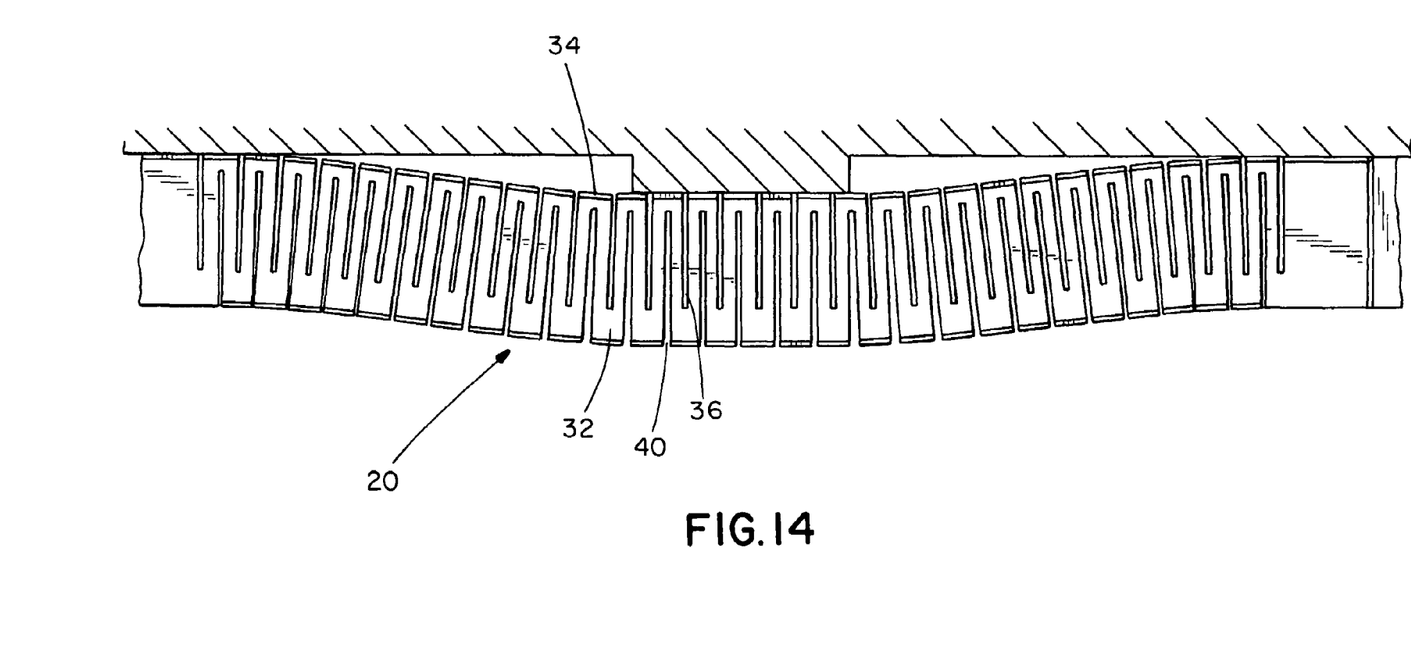
FIG. 14 is a top side view of a flexible wiring duct according to yet another embodiment of the present invention.

Because wiring duct 20 is bendable in center section 30 between first end 26 and second end 28, wiring duct 20 is positionable in a plurality of configurations. Wiring duct 20 can be utilized in cable management systems to correct misalignments and transition through offsets or directional changes, such as where the two adjoining sections are not linearly aligned. For example, as shown in FIGS. 1 and 2, wiring duct 20 has been laterally offset to route cables vertically from tee fitting 22 to network rack 24. FIG. 12 also shows wiring duct 20 having a lateral offset. Alternatively, FIG. 11 shows center section 30 bowing outwardly and, thus, wiring duct 20 offset in a longitudinal direction. FIG. 13 also shows wiring duct 20 offset in a longitudinal direction to account for a change of elevation in a cable management system. Moreover, as shown in FIG. 14, wiring duct 20 may be utilized to avoid obstacles, such as a wall, where the two adjoining sections are linearly aligned but the cable pathway is obstructed.

The disclosed invention provides a flexible wiring duct having the ability to flex in any direction. It should be noted that the above-described illustrated embodiments and preferred embodiments of the invention are not an exhaustive listing of the form such a flexible wiring duct in accordance with the invention might take; rather, they serve as exemplary and illustrative of embodiments of the invention as presently understood. By way of example, and without limitation, a flexible wiring duct having a lateral offset and a longitudinal offset is contemplated to be within the scope of the invention. Many other forms of the invention are believed to exist.

The invention claimed is:

1. A flexible wiring duct comprising:
   a base;
   a first side wall connected to the base;
   a second side wall connected to the base;
   a first aperture formed in the first side wall and extending into the base; and
   a second aperture formed in the second side wall and extending into the base,
   wherein the first aperture extends only through a portion of the first side wall and a portion of the base.

2. The flexible wiring duct of claim 1, wherein at least a portion of the first aperture overlies at least a portion of the second aperture in the base.

3. The flexible wiring duct of claim 1, wherein the second aperture extends only through a portion of the second side wall and a portion of the base.

4. The flexible wiring duct of claim 1, wherein the first aperture is substantially the same length as the second aperture.

5. The flexible wiring duct of claim 1, further comprising a third aperture formed in the first side wall or the second side wall.

6. The flexible wiring duct of claim 5, wherein the third aperture extends only through a portion of the first side wall or the second side wall.

7. The flexible wiring duct of claim 1, wherein the base comprises a first end having no apertures formed therein.

8. The flexible wiring duct of claim 7, wherein the base further comprises a second end having no apertures formed therein.

9. A flexible wiring duct comprising:
   a base;
   a first side wall connected to the base;
   a second side wall connected to the base;
   a first aperture formed in the first side wall and extending into the base;
   a second aperture formed in the second side wall and extending into the base; and
   a third aperture formed in the first side wall or the second side wall, the third aperture extending only through a portion of the first side wall or the second side wall.

* * * * *